(12) United States Patent
Hwang

(10) Patent No.: US 8,402,175 B2
(45) Date of Patent: Mar. 19, 2013

(54) METHOD AND APPARATUS FOR DETERMINING EXTERNAL CONNECTION DEVICE IN MOBILE TERMINAL

(75) Inventor: Jeong Ho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 12/400,471

(22) Filed: Mar. 9, 2009

(65) Prior Publication Data

US 2009/0228614 A1    Sep. 10, 2009

(30) Foreign Application Priority Data

Mar. 10, 2008 (KR) .................. 10-2008-0022031

(51) Int. Cl.
*G06F 3/00* (2006.01)
(52) U.S. Cl. .................. 710/16; 327/524; 455/557
(58) Field of Classification Search .................. None
See application file for complete search history.

(56) References Cited

U.S. PATENT DOCUMENTS

| | | | | |
|---|---|---|---|---|
| 6,725,061 | B1 * | 4/2004 | Hutchison et al. | 455/557 |
| 6,904,488 | B2 * | 6/2005 | Matsumoto et al. | 710/313 |
| 7,863,865 | B2 * | 1/2011 | Hussain et al. | 320/140 |
| 2006/0080476 | A1 * | 4/2006 | Wang et al. | 710/15 |
| 2007/0245058 | A1 * | 10/2007 | Wurzburg et al. | 710/313 |
| 2008/0272741 | A1 * | 11/2008 | Kanamori | 320/137 |
| 2010/0257286 | A1 * | 10/2010 | Hanson et al. | 710/16 |

FOREIGN PATENT DOCUMENTS

| | | |
|---|---|---|
| CN | 101420480 | 4/2009 |
| TW | 200609742 | 3/2006 |

OTHER PUBLICATIONS

Chinese Office Action dated May 25, 2011 in the corresponding Chinese Patent Application No. 200910118456.7.
Third Office Action of CN Application No. 200910118456.7 issued Oct. 25, 2012.

* cited by examiner

*Primary Examiner* — Elias Mamo
(74) *Attorney, Agent, or Firm* — H.C. Park & Associates, PLC

(57) ABSTRACT

The present invention relates to a method and an apparatus for determining an external connection device connected to a portable terminal. A multi-connector, and a charging cable and a data cable having the same are disclosed. According to the method, a logic level of the external connection device is determined when the external connection device is connected to the portable terminal. The external connection device is distinguished according to the logic level and performing control corresponding to the external connection device.

19 Claims, 6 Drawing Sheets

METHOD AND APPARATUS FOR DETERMINING EXTERNAL CONNECTION DEVICE IN MOBILE TERMINAL

CROSS REFERENCE TO RELATED APPLICATION

This application claims priority from and the benefit of Korean Patent Application No. 10-2008-0022031, filed on Mar. 10, 2008, which is hereby incorporated by reference for all purposes as if fully set forth herein.

BACKGROUND OF THE INVENTION

1. Field of the Invention

The present invention relates to a method and an apparatus for determining a kind of an external connection device connected to a portable terminal by detecting a signal transmitted to and received from the external connection device, and for performing an operation according to the determined kind of the external connection device.

2. Discussion of the Background

A portable terminal may have many applications because of easy portability, ability to store various programs, and excellent utility. There may be increased numbers of users of a portable terminal because voice calling is enabled during movement of an individual user.

Early in the development of portable terminals, batteries and other devices were very large in size in order to achieve stability, which made the above-mentioned portable terminals heavy and large which decreased its utility as a portable terminal. Recently the devices and the battery have been improved, so that a portable terminal may be very light, thinner, and small in size.

The portable terminal may have a charging mode for charging the battery and a communication mode for data communication. The portable terminal may be connected to a terminal adaptor (TA) to support the charging mode and may be connected to an external device to support the communication mode.

To charge the portable terminal, a data cable connecting the portable terminal to the TA may be provided. Moreover, the portable terminal may include a connector interface to which the data cable is connected. This connector interface may be used as a path through which the TA of the portable terminal is connected and as a path for supporting universal serial bus (USB) communication of the portable terminal.

However, in an existing portable terminal, a power source used in the charging mode may be different from that used in the communication mode. Thus, if the portable terminal recognizes the external connection device as the TA when the portable terminal is connected to the external connection device through the data cable to support the communication mode, an error may be generated from the user interface (UI) of the portable terminal. Moreover, when electric power more than the maximal current regulated under a standard is supplied, an error may be generated from the external connection device.

For example, in a case when the external connection device is a highly integrated device affected even by a minute change of electric power such as a laptop computer, an MP3 player, and the like, when the portable terminal transmits and receives signals to and from the external device using a power source in the charging mode, a central processing unit and peripheral hardware of the portable terminal may be damaged.

Therefore, the portable terminal should be capable of determining whether the external connection device is a terminal adaptor or other external device. The portable terminal should determine whether a device connected thereto through the data cable is a terminal adaptor for charging the portable terminal or an external device for USB data communication with the portable terminal.

SUMMARY OF THE INVENTION

The present invention provides a method and an apparatus of a portable terminal for precisely determining a kind of an external device connected to a portable terminal through a data cable.

The present invention also provides a method and an apparatus of a portable terminal for determining a kind of an external connection device to be connected to the portable terminal so as to control a signal processing in a charging mode and a communication mode of the portable terminal.

The present invention also provides a method and an apparatus for determining a terminal adaptor and an external device that are connected to the portable terminal through a data cable, to perform signal transmission and reception according to the determined device so that a malfunction of the portable terminal may be prevented.

Additional features of the invention will be set forth in the description which follows, and in part will be apparent from the description, or may be learned by practice of the invention.

The present invention discloses a method of determining an external connection device in a portable terminal comprising: determining a logic level of the external connection device when the external connection device is connected to the portable terminal; and distinguishing the external connection device according to the logic level and performing a control that corresponds to the external connection device.

The present invention also discloses a method of determining an external connection device in a portable terminal comprising: detecting a logic level from a signal line of the external connection device when the external connection device is connected to the portable terminal and outputting the detected logic level; determining the logic level; recognizing the external connection device as a terminal adaptor when the logic level has one value; and recognizing the external connection device as an external device when the logic level has other value.

The present invention also discloses a portable terminal connected to an external connection device comprising: an external connection interface to which the external connection device connects; a detector to detect a signal from the external connection device and to output a logic level acquired from the detected signal; and a control unit to control the external connection interface and the detector, to determine a kind of the external connection device from the logic level, and to control a signal processing with respect to the external connection device.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
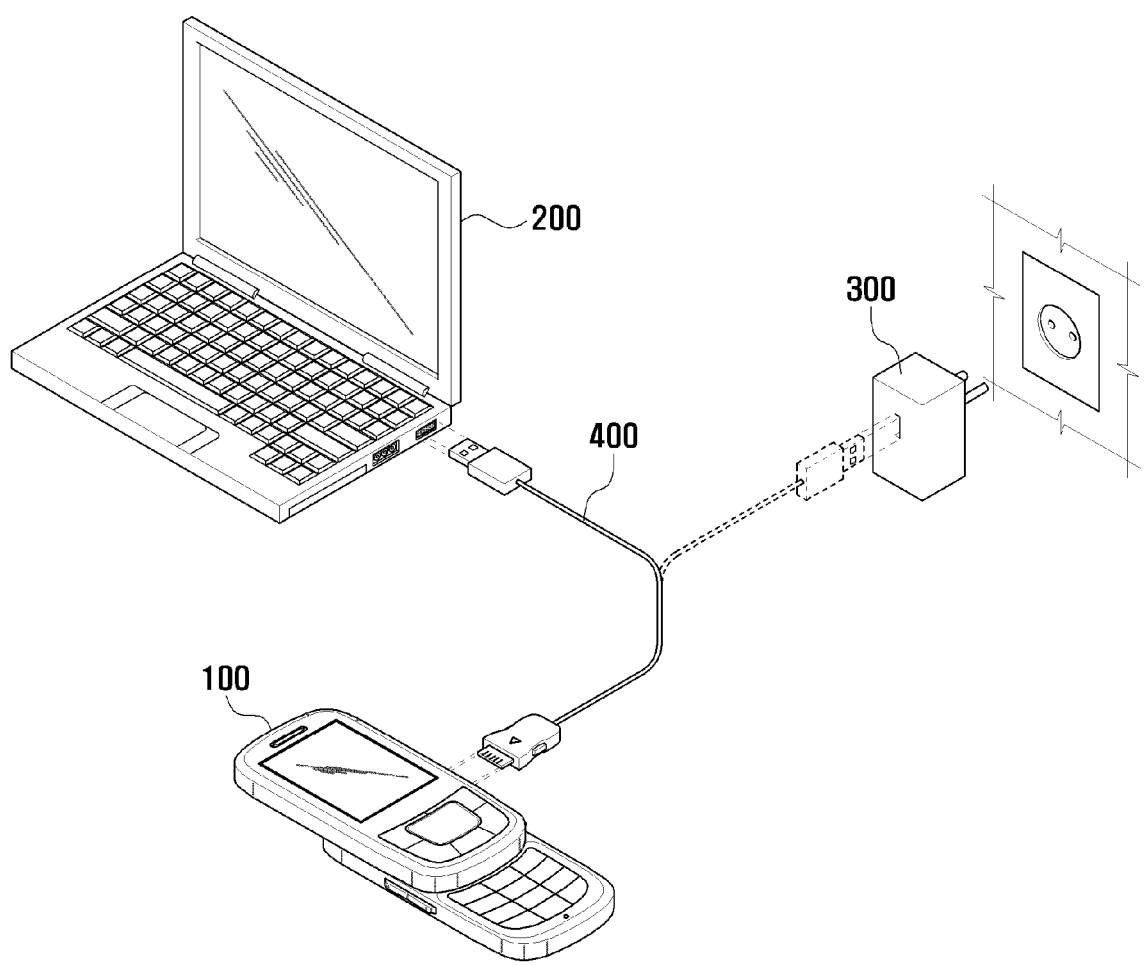
FIG. 1 is a schematic view showing a connection system according to an exemplary embodiment of the present invention.

Hereinafter, exemplary embodiments of the present invention are described in detail with reference to the accompanying drawings. In this description, only parts necessary to understand operation of the exemplary embodiments of the present invention will be described, and others will be omitted to avoid obscuring the subject matter of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. The present invention relates to a method of determining a kind of external connection devices connected to a portable terminal through a data cable and an apparatus for the same. Particularly, according to the embodiments of the present invention, before turning on a portable terminal using a Terminal Adaptor (TA), it is possible to determine whether an external connection device connected to the portable terminal through a data cable is a TA or other external device. By doing so, the present invention provides method and apparatus for determining an external connection device such that a recognizing speed of the external connection device connected to the portable terminal is increased and a connection error between the portable terminal and the external connection device can be prevented.

In the exemplary embodiments of the present invention, the external connection device means various external devices including the TA. Thus, in the exemplary embodiments of the present invention, the external connection device includes every device capable of being connected to the portable terminal through a USB interface, such as the TA, a personal computer, a laptop computer, a Personal Digital Assistant (PDA), an MP3 player, a game player, a digital broadcasting receiver, a wireless communication module, and the like. That is, in the exemplary embodiments of the present invention, the external connection device means a device connected to the portable terminal.

However, since the present invention is characterized by distinguishing the TA and other external devices, hereinafter, in the following description, the external device is distinguished from the TA and the external connection device except that the TA is called as an external device for illustrative purposes. Thus, in the following description, it is understood that the external device indicates all the above-described devices except for the TA.

Moreover, the portable terminal according to an exemplary embodiment of the present invention is connected to the TA and other various external devices, and may be applied to all information communication devices and multimedia devices using the TA, such as a mobile communication terminal, a digital broadcasting terminal, a PDA, a smart phone, an MP3 player, a laptop computer, and various other applications thereof.

Hereinafter, a connection system for describing a function of the present invention based on a connection of a portable terminal with a TA and an external device through a data cable will be described.

FIG. 1 is a schematic view showing a connection system according to an exemplary embodiment of the present invention.

As shown in FIG. 1, the connection system according to an exemplary embodiment of the present invention includes a portable terminal 100, an external device 200, a Terminal Adaptor (TA) 300, and a data cable 400 connecting the portable terminal 100 to the external device 200 or the TA 300. Here, the data cable 400 is a USB data cable that may be provided in the external device 200 and the TA 300.

The connection system according to the present exemplary embodiment detects a signal from the external device 200 or the TA 300, which is connected to the portable terminal 100 through the data cable 400, and determines whether the connected device is the external device 200, used for data communication, or the TA 300, used for charging the portable terminal, 100 based on a detected value (for example, High or Low). Moreover, the portable terminal 100 detects a signal from the external device 200 or from the TA 300, which is connected thereto through the data cable 400, and compares the detected value with a preset value to determine whether the device currently connected thereto through the data cable 400 is the external device 200 or the TA 300.

The portable terminal 100 is supplied with a charging electric power from the TA 300 through the data cable 400, and transmits and receives signals for data communication to and from the external device 200.

Referring to FIG. 1, when the portable terminal 100 is connected to one of the external device 200 and the TA 300, the portable terminal 100 detects a signal value transmitted from the external device 200 or the TA 300. The portable terminal 100 determines what kind of device is connected through the data cable 400 based on the detected signal value. After that, the portable terminal 100 processes signals transmitted and received to and from the connected device.

For example, when the device connected to the portable terminal 100 through the data cable 400 is determined as the external device 200, the portable terminal 100 processes signal transmission and reception to and from the external device 200 in a communication mode for data communication. Moreover, when the device connected to the portable terminal 100 through the data cable 400 is determined as the TA 300, the portable terminal 100 may charge a battery of the portable terminal 100 with a charging electric power supplied from the TA 300 according to a charging condition in a charging mode.

The external device 200 is one of the various devices that may be connected to the portable terminal 100, and performs data communication with the portable terminal 100 according to a request from the portable terminal 100 when the external device 200 is connected to the portable terminal 100. The external device 200 may communicate with the portable terminal 100 using the USB interface when connected to the portable terminal 100 through the data cable 400. Configuration of the USB interface between the external device 200 and the portable terminal 100 will be described below, thus, a detailed description thereof will presently be omitted.

The TA 300 has an end that may connect to the portable terminal 100 through the data cable 400, and another end that may connect to an electric outlet supplying electric power so that electric power may be supplied to the portable terminal 100. The TA 300 may transform a high voltage supplied from the electric outlet and apply the transformed voltage to the portable terminal 100. The TA 300 may supply electric power to the portable terminal 100 using a maximum rated current with an allowable preset margin to the portable terminal 100 and the battery of the portable terminal 100. The configuration of the USB interface between the TA 300 and the portable terminal 100 will be described below, thus, a detailed description thereof will presently be omitted.

The data cable 400 includes a first connector connected to a side of the portable terminal 100, a second connector connected to the external device 200 or the TA 300, and a wire connecting the first connector and the second connector. Each of the first and second connectors includes a hook-shaped device for maintaining a secure coupling with the portable terminal 100, the external device 200, and the TA 300, and a control terminal for controlling the hook-shaped device for easy separation therefrom. The second connector includes a device that may be connected to the USB interface of the external device 200 or the TA 300. A configuration of the internal USB interface of the data cable 400 will be described below, thus, a detailed description thereof will presently be omitted.

According to the connection system described above, the portable terminal 100 is connected to the external connection device using the data cable 400. Particularly, the portable terminal 100 detects a signal transmitted from the connected external connection device through the USB interface and determines whether the external connection device connected to the portable terminal 100 is the external device 200 or the TA 300 according to the detected signal. In other words, the portable terminal 100 determines a kind of the external connection device based on the USB interface type of the connected external connection device, and controls charging the battery of the portable terminal 100 and data communication of the portable terminal 100 according to the determination.

Hereinafter, the USB interfaces of the external device 200 connected to the portable terminal 100 and data communication therebetween, the TA 300 supplying the charging electric power to the portable terminal 100, and the data cable 400 connecting the portable terminal 100 to the external connection device will be described.

Figure 2A:
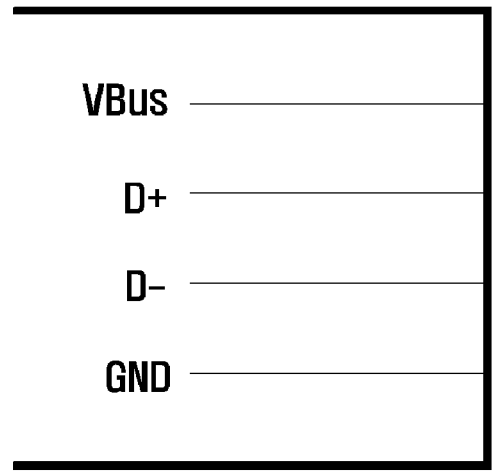
FIG. 2A, FIG. 2B, and FIG. 2C are schematic views showing USB interface configurations of respective devices for forming the connection system according to an exemplary embodiment of the present invention.
Figure 2B:
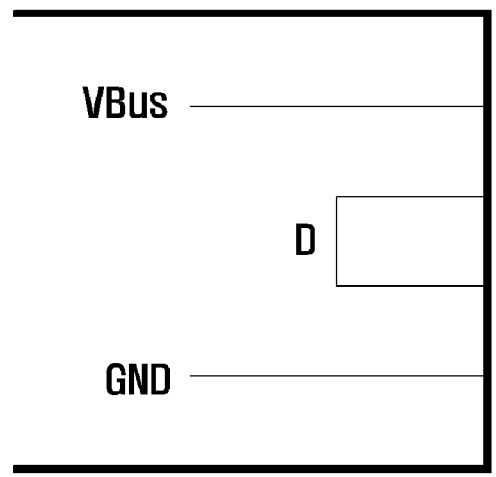
Figure 2C:
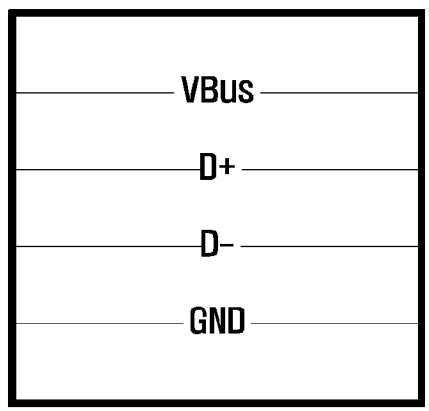

FIG. 2A, FIG. 2B, and FIG. 2C are schematic views showing USB interface configurations of the respective devices for forming the connection system according to exemplary embodiments of the present invention.

FIG. 2A schematically shows the USB interface of the external device 200, FIG. 2B schematically shows the USB interface of the TA 300, and FIG. 2C schematically shows the USB interface of the data cable 400.

Referring to FIG. 2A, the USB interface of the external device 200 includes four signal lines. The USB interface of the external device 200 includes a first signal line D+, a second signal line D−, a power line VBus, and a ground line GND. When the external device 200 is connected to an external connection device such as the portable terminal 100, the USB interface of the external device 200 transmits and receives signals through the first and second signal lines D+ and D−. For example, the first and second signal lines D+ and D− of the USB interface of the external device 200 are connected to a first signal line D+ and a second signal line D− of an external connection interface of the portable terminal 100 to transmit and receive signals to and from the portable terminal 100.

Referring to FIG. 2B, the USB interface of the TA 300 includes four signal lines. The USB interface of the TA 200 includes a power line VBus, a ground line GND, and a closed line D. Since the TA 300 does not perform a signal transmission for data communication, the USB interface of the TA 300 includes the closed line D in which the first signal line D+ and the second line D− are shorted. Thus, a preset voltage flows through the closed line D of the TA 300 and the first and second lines D+ and D− of the portable terminal 100, which is referred to as a pull-up voltage PU of the portable terminal 100. As described above, the signal lines of the USB interface of the external device 200 are arranged differently from those of the USB interface of the TA 300.

The power line VBus of the USB interface of the TA 300 is a plus terminal of a DC output power and the ground line GND thereof is a minus terminal of the DC output power. The first and second signal lines D+ and D− of the TA 300 are shorted to form the closed line D so that the closed line D is not connected to the TA. Due to this special connection, it is possible to determine whether an external connection device connected to the portable terminal 100 is the TA 300.

Referring to FIG. 2C, in the USB interface of the data cable 400, as described above, each of the first and second connectors includes four signal lines. That is, the USB interface of the data cable 400 is identically configured in the first and second connectors of respective signal lines that are connected to each other. Each of the first and second connectors includes a first signal line D+, a second signal line D−, a power line VBus, and a ground line GND.

The USB interface of the data cable 400 connects the portable terminal 100 to the external device 200 or the portable terminal 100 to the TA 300 through the first and second connectors. The USB interface of the data cable 400 transmits and receives signals through the first signal line D+ and the second signal line D− when there is a connection with the external connection device.

For example, the first signal line D+ and the second signal line D− of the USB interface are respectively connected to the first signal line D+ and the second signal line D− of the external connection interface of the portable terminal 100 to transmit and receive signals thereto and therefrom.

The data cable 400 is a connecting device for connecting the portable terminal 100 to the external device 200 or the portable terminal 100 to the TA 300, and the data cable 400 is connected to the external connection interface of the portable terminal 100 through one connector of the data cable 400 and is connected to the external device 200 or the TA 300 through the other connector.

Meanwhile, in the present exemplary embodiment, when the external connection device such as the external device 200 and the TA 300 include a device directly connected to the portable terminal 100 through the connectors of the data cable 400, the data cable 400 may be omitted from the connection system.

The configurations of the external connection device, that is, the external device 200 and the TA 300, and the data cable 400 connecting the external connection devices to the portable terminal 100 are described above. Hereinafter the portable terminal 100 and a method of determining the external connection device connected thereto according to an exemplary embodiment of the present invention will be described.

Figure 3:
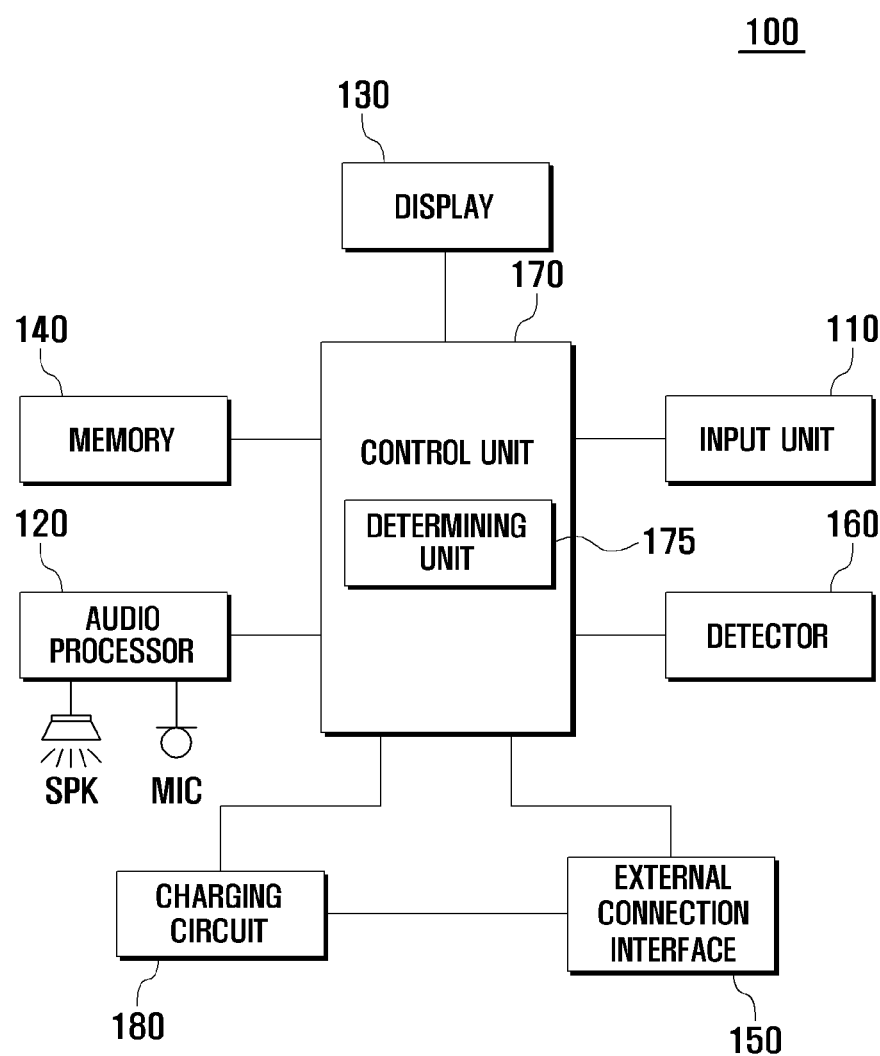
FIG. 3 is a view showing a configuration of a portable terminal according to an exemplary embodiment of the present invention.
Figure 4:
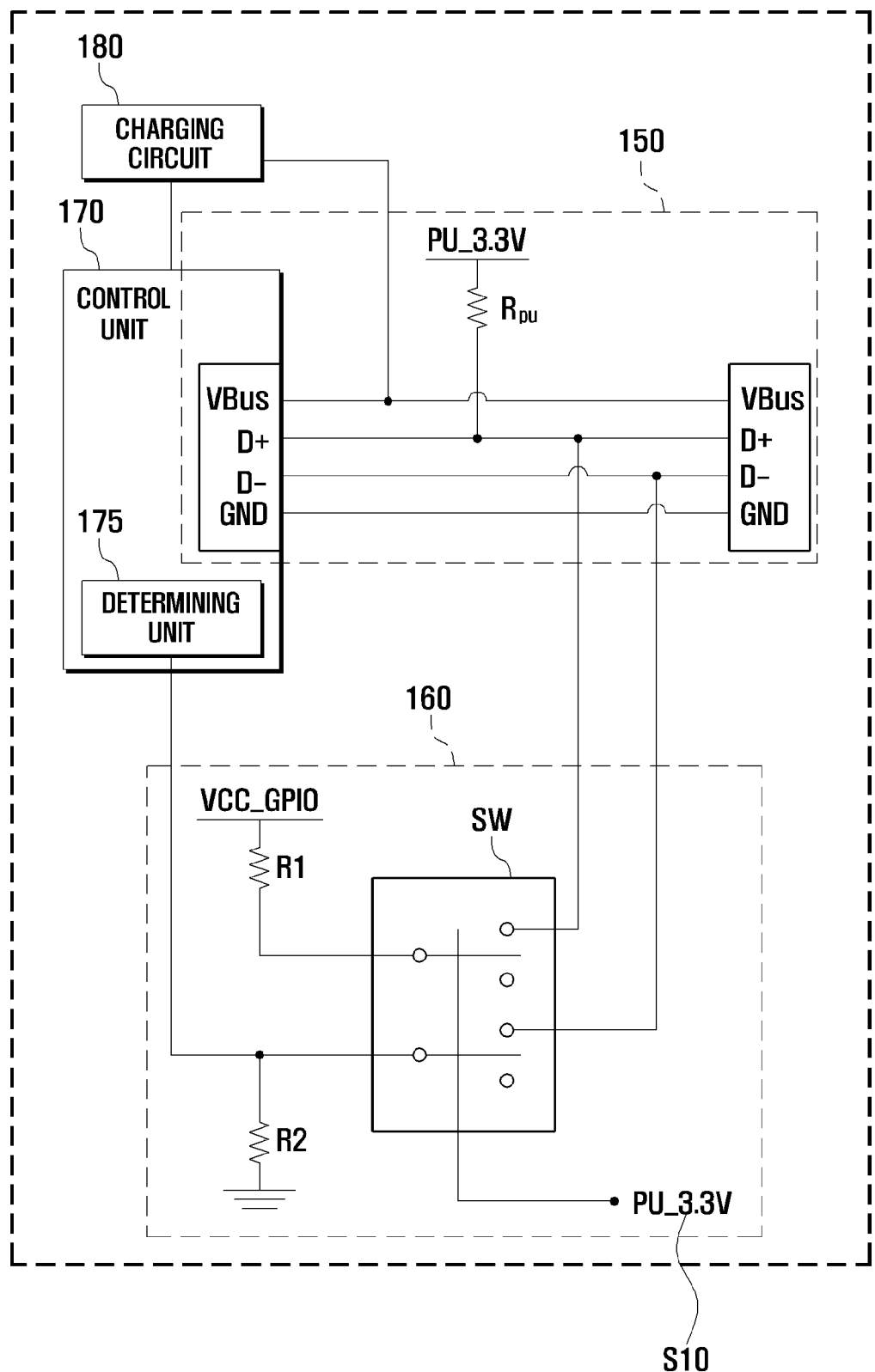
FIG. 4 is a detail view showing a configuration of the portable terminal for distinguishing an external connection device and a terminal adaptor that are connected to the portable terminal, according to an exemplary embodiment of the present invention.

FIG. 3 is a view showing configuration of a portable terminal according to an exemplary embodiment of the present invention, FIG. 4 is a detail view showing configuration of the portable terminal for distinguishing the external device 200 and the TA 300 by the portable terminal 100 according to an exemplary embodiment of the present invention.

As shown in FIG. 3 and FIG. 4, the portable terminal 100 includes an input unit 110, an audio processor 120, a display 130, a memory 140, an external connection interface 150, a detector 160, a charging circuit 180, and a control unit 170.

The input unit 110 receives various information and transmits a key signal related to settings of various functions and the functional control of the portable terminal 100 to the control unit 170. The input unit 110 may be one of a touch pad, a general key pad, a QWERTY key pad, and a combination thereof according to a type of the portable terminal 100.

When the external connection device such as the external device 200 and the TA 300 is connected to the portable terminal 100, the input unit 110 generates a key signal for controlling the external connection device and sends the key signal to the control unit 170. The input unit 110 may be substituted by an external connection device connected to the portable terminal 100. That is, when the external connection device is an auxiliary input device of the portable terminal 100, the external connection device may be connected to the portable terminal 100 through the external connection interface 150 of the portable terminal 100 to generate a key signal used to control the portable terminal 100.

The audio processor 120 converts an audio signal generated from the portable terminal 100 into audible sound through a speaker SPK to output the audible sound, and collects audio signals input from a microphone MIC to transmit the audio signals to the control unit 170.

When the external connection device is connected to the portable terminal 100, the audio processor 120 generates a signal informing the connection of the external connection device in order to output sound through the speaker SPK. The audio processor 120 may be substituted by the external connection device. In other words, when the external connection device is an independent audio device, the external connection device is connected to the portable terminal 100 through the external connection interface 150 and reproduces and collects audio signals generated from the portable terminal 100 to transmit the same to the control unit 170.

The display 130 displays various menus of the portable terminal, information input by a user, and information provides to the user. The display 130 may display screen data generated during the performance of functions of the portable terminal 100, for example, an image related to establish a traffic channel in response to an input key signal for the establishment of a traffic channel when a calling function is activated.

When an external connection device is connected to the portable terminal 100 through the external connection interface 150, the display 130 may display information on the type of the external connection device. For example when the external connection device is the external device 200, the display 130 displays an image of or information on the external device 200. Moreover, when the external connection device is the TA 300, the display 130 displays a TA-shaped image, information about the TA 300, or an image or information that a charge is being performed. The display 130 may be implemented by a liquid crystal display (LCD). The LCD may be a touch screen and the display 130 may be provided in the input unit.

The memory 140 stores at least one application required for performing functions according to the present exemplary embodiment and user data generated when using various functions provided by the portable terminal 100. The memory 140 may include a program region and a data region.

In the program region, an Operating System (OS) booting the portable terminal 100, options of the portable terminal 100 are stored. The options may include applications required for a camera function, a sound reproducing function, an image and moving picture reproducing function, and the like. When the portable terminal 100 activates the respective functions in response to the request from the user, the functions are services under the control of the control unit 170 using corresponding applications. When an external connection device is connected to the portable terminal 100, an application determining a kind of the external connection device and an application associated with the corresponding external connection device may be stored in the program region. In other words, an application activated only when the portable terminal 100 is connected to an external connection device may be stored in the program region.

The data region is a region that stores data. The data may be generated when the portable terminal 100 is used, and user data related to the use of the various optional functions such as an image or a moving picture taken using the camera function, phone book data, audio data and corresponding contents, and information corresponding to user data may also be stored in the data region. In the data region, reference data on the various external connection devices to be connected to the portable terminal 100 may be stored. The reference data may contain a signal value to be detected by the portable terminal 100 when the external connection device is connected thereto. A method of determining the external connection device using the reference data will be described below, thus, a detailed description thereof is presently omitted.

The external connection interface 150 is connected to an external connection device to transmit a signal from the control unit 170 in USB interface manner. A signal from the connected external connection device in the USB interface manner may also be transmitted to the control unit 170. An internal configuration of the external connection interface 150 for performing the signal transmission in USB interface manner is shown in FIG. 4.

Referring to FIG. 4, the external connection interface 150 includes a connector connected to the external connection device and a connector for transmitting a signal to the control unit 170. The external connection interface 150 includes first and second signal lines D+ and D− which are connected to an external connection device, which are used to transmit and receive signals, a power line VBus, and a ground line GND.

The external connection interface 150 may transmit data using a difference between signals flowing through the first and second signal lines D+ and D−. The first signal line D+ transmits a signal when a voltage is pulled down from a preset voltage and the second signal line D− transmits a signal when a voltage is pulled up from a ground voltage. In other words, the first signal line D+ transmits a signal while the pull-up/down of a voltage is within a range of 3.3 V to 1.5 V, and the second signal line D− transmits a signal while the pull-up/down of a voltage is within a range of the ground voltage to 1.5 V.

In other words, as shown in FIG. 4, since a pull-up voltage PU_3.3V is applied to at least one of the first and second signal lines D+ and D−, the pull-up voltage PU_3.3V is changed into a pull-down voltage when an external connection device is connected. In order to change the pull-up voltage applied to the at least one of the signal lines into the pull-down voltage after connecting the external connection device, a resistor Rpu of resistance greater than that of a resistor R disposed to the external connection device may be disposed to the pull-up voltage.

As shown in FIG. 4, when the portable terminal 100 is connected to the external device 200, the first signal line D+ of the external connection interface 150 may transmit the pull-up voltage, which informs the portable terminal 100 that it is connected to the external device 200. That is, the external connection interface 150 normally maintains the preset voltage at the pull-up voltage and transmits the pull-up voltage to the external device 200 when the external device 200 is connected. The external device 200 recognizes the connection of the portable terminal 100 and transmits a signal to the first and second signal lines D+ and D−, where the signal is generated by performing a corresponding function. The pull-up voltage may be maintained to a preset voltage, for example 3.0 to 3.3V. The pull-up voltage may differ according to a portable terminal.

External connection devices including the external device 200 have a pull-down resistance Rpd under the USB standard, wherein the pull-down resistance Rpd is generally 15 Kohm+5% (14.25 Kohm to 15.75 Kohm). Thus, when the external device 200 and the portable terminal 100 are connected to each other through the external connection interface 150, the portable terminal 100, specifically the external connection interface 150, applies the pull-up voltage Rpu so that the USB interface may be started.

The external connection interface 150 may be a connector port and a USB port.

When the external connection device is connected through the external connection interface 150, the detector 160 detects a signal generated by the connection of the external connection device and transmits the detected result to the control unit 170. The detector 160 detects a logic level from the signal transmitted from the external connection interface 150 and transmits the detected logic level to the control unit 170. Then, the control unit 170 may distinguish a kind of the external connection device from a value of the logic level. For example, when the logic level is logic high, the control unit 170 determines the external connection device as the TA 300. When the logic level is logic low, the control unit 170 determines the external connection device as the external device 200.

The detector 160 distinguishes the TA 300, in which the first and second signal lines D+ and D− of the USB interface are shorted to each other, from the external device 200, and includes a switch SW for the stability of circuits in the detector 160 and for the separation of signal lines from the external connection interface 150 when the portable terminal 100 performs data communication with the external device 200. In addition, the detector 160 may include resistors R1 and R2 of preset resistances, which may improve circuit stability. Respective resistances of the resistors R1 and R2 may be adjusted in correspondence with respective circuit configurations. In the present exemplary embodiment, the resistors R1 and R2 are 100 Kohm and 1 Mohm, respectively.

The switch SW may be a high speed USB (HSUSB) switch. The HSUSB switch may be switched on/off by applying the pull-up voltage PU_3.3V (See S10 in FIG. 4) used for the pull-up, that is, a switching operation to the first or second signal line D+ or D− of the USB interface. The pull-up voltage PU_3.3V (S10) is LOW before the USB data communication is started, and in this case the switch SW may be operated such that the internal circuit of the detector 160 is connected to the first and second signal lines D+ and D− of the external connection interface 150.

Detailed operation of the detector 160 is described below.

The operation of the detector 160 when the TA 300 is connected to the external connection interface 150 will be described below.

Since the first and second signal lines D+ and D− of the TA 300 are shorted to each other when the TA 300 is connected, the detector 160 detects the logic high signal from the first and second signal lines D+ and D− of the external connection interface 150, and transmits the logic high signal to a determining unit 175 of the control unit 170. Then, the determining unit 175 receives the logic high signal through a General Purpose In/Out (GPIO) connection or a detection pin. In this case, VCC_GPIO connected to the resistor R1 of the detector 160 may use the same voltage as that of a power pad of the determining unit 175, and VCC_GPIO*0.9V may be applied to the determining unit 175 due to the voltage distribution by the resistors R1 and R2. Since an input level VIH of a complementary metal-oxide semiconductor (CMOS) logic IC is generally VDD*0.7V, it may not be difficult for the determining unit 175 to recognize the logic high signal. In this case, the resistances of the resistors R1 and R2 may be adjusted to correspond to the respective circuits.

Since the first and second signal lines D+ and D− of the TA 300 are shorted to each other, the detector 160 supplies a preset voltage HIGH to the first signal line D+ of the external connection interface 150 and determines the connected external connection device as the TA 300 when the preset voltage HIGH is checked from the second signal line D−.

The operation of the detector 160 when the external device 200 is connected to the external connection interface 150 will be described below.

When the external device 200 is connected, the pull-down resistor Rpd of 15 Kohm may be connected to the first and second signal lines D+ and D− of the external device 200 as described above. In this case, since the resistor R1 of the detector 160, as described above, is 100 Kohm, a voltage of {PU_3.3V*Rpd/(Rpd+R1)}V is applied to the first signal line D+ of the external connection interface 150. For example, when the resistor R1 and the pull-down resistor Rpd have tolerance of 5%, the first signal line D+ has a voltage range of minimum {PU_3.3V*0.12}V to maximum {PU_3.3V*0.14}V. Since the input level VIH provided in the USB standard is 2.0V, the USB interface may not be operated by the above voltage. Thus, a malfunction should not occur in the present invention. Moreover, the GPIO or the detection pin of the determining unit 175 maintains the logic low by the resistor R2.

That is, the detector 160 supplies a preset voltage HIGH to the first signal line D+ of the external connection interface 150. At this time, when a preset voltage LOW is checked from the second signal line D−, the detector 160 determines the preset voltage applied to the first signal line has been transmitted to the external connection device and determines the external connection device as the external device 200 based on the determination.

As described above, when the preset voltage is input through the power line VBus of the USB interface, the TA 300 and the external device 200 may be distinguished according to the logic high/logic low of the logic level inputted into the GPIO or the detection pin of the determining unit 175.

Meanwhile, when the connected external connection device is determined as the external device 200 by the above-described operation, the detector 160 applies the pull-up voltage PU 3.3V (S10). In this case, the control unit 170 and the detector 160 are separated from the first and second signal lines D+ and D− of the external connection interface 150 by the switch SW of the detector 160.

On the other hand, in the present exemplary embodiment, when the external device 200 is connected, the detector 160 detects a change of preset voltages of the first and second signal lines D+ and D− and transmits the detected result to the control unit 170. Then, the control unit 170 may determine a kind of the external device 200 according to the change of the preset voltages. In other words, the control unit 170 compares the reference data stored in the memory 140 with the detected value and determines what the currently connected external device is, for example, whether the external device 200 is a laptop computer or a PDA, based on the voltage change.

The control unit 170 controls overall operation of the portable terminal 100 and signal flows between inner units of the portable terminal 100. The control unit 170 controls signal flows between the units such as the input unit 110, the audio processor 120, the display 130, the memory 140, the external connection interface 150, and the detector 160. The control unit 170 may include a MODEM and a CODEC when the portable terminal 100 is a communication terminal.

The control unit 170 receives the detected result from the detector 160, determines a kind of the connected external connection device according to the detected result, and processes operation corresponding to the determination. That is, when the external connection device is determined as the external device 200, the control unit 170 performs the signal transmission and reception for the data communication with the external device 200 through the external connection interface 150. When the external connection device is the TA 300, the control unit 170 activates the charging function and controls the TA 300 to charge the battery of the portable terminal 100 through the external connection interface 150. Moreover, as an application of the above-described operations, when the external connection device is determined as a network module for the connection with a mobile communication network, the control unit 170 establishes a traffic channel with the mobile communication network to perform the signal transmission and reception using wireless communication.

The control unit 170 includes the above-described determining unit 175. The determining unit 175 includes any one of the GPIO and the detection pin. The determining unit 175 receives the detected value from the detector 160 through the GPIO or the detection pin, distinguishes the logic level of the detected value, and determines whether the external connection device is the external device 200 or the TA 300.

The control unit 170 compares the reference data stored in the memory 140 with the detected value from the detector 160 and determines what the currently connected external device 200 is.

The charging circuit 180 performs processing related to charging the battery of the portable terminal 100 when the external connection device is the TA 300. The charging circuit 180 may control an amount of charging current for charging the battery. The charging circuit 180 can may charge the battery of the portable terminal 100 based on the amount of current which is transmitted from the connected TA 300.

FIG. 3 and FIG. 4 schematically show the portable terminal according to an exemplary embodiment of the present invention, and the portable terminal of the present invention is not limited thereto. The portable terminal of the present invention may further include a communication module, a camera module, an electronic payment module, a digital broadcasting module, and a near-communication module. Moreover, in the portable terminal of the present invention, a specific functional block may be omitted or substituted by another functional block.

As described above, the schematic configuration and operation of the portable terminal according to an exemplary embodiment of the present invention is described. Next, an operation for detecting an external connection device and for associating the external connection device will be described. Since the present invention is not limited to the following description, various modifications and changes may alternatively be implemented.

Figure 5:
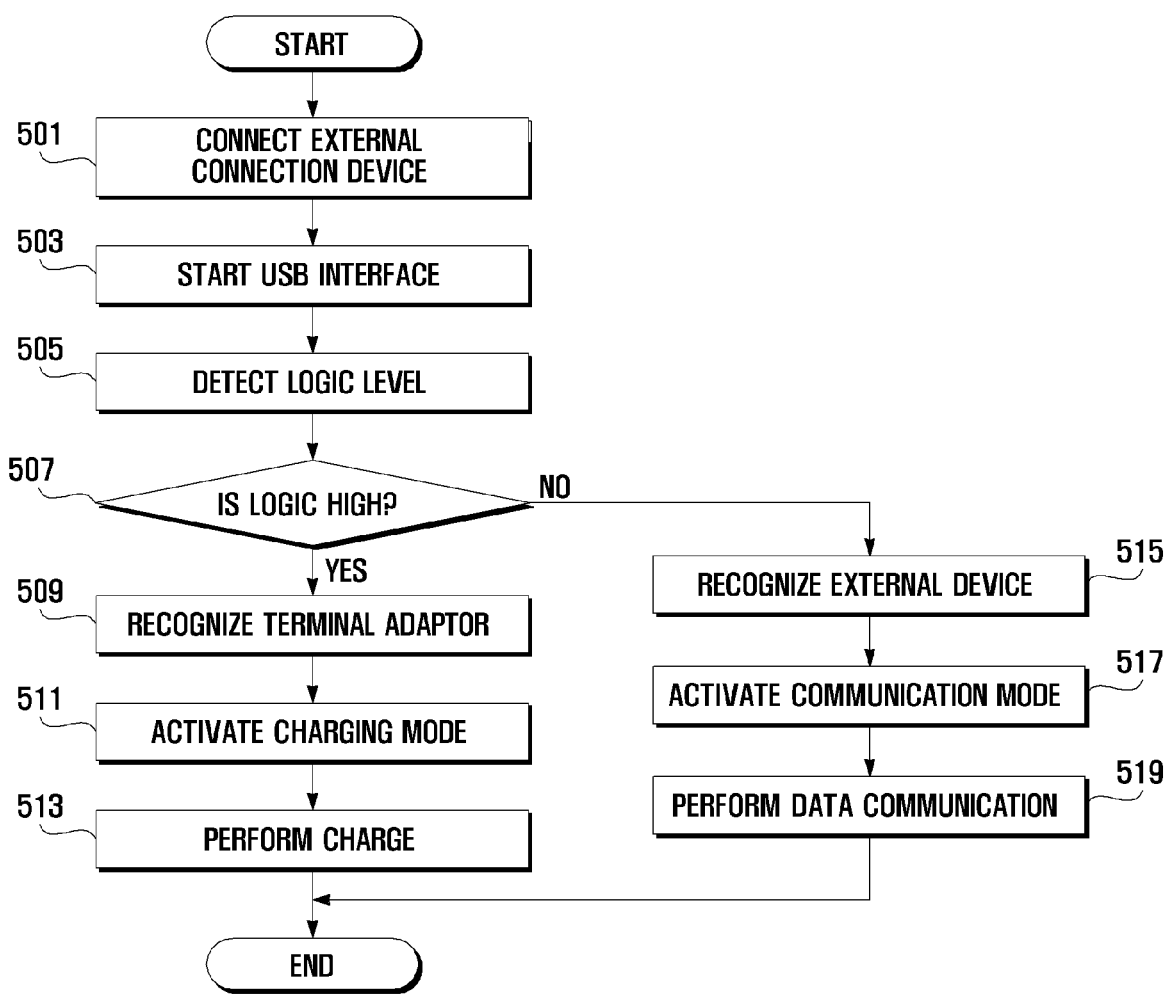
FIG. 5 is a flowchart showing a method of processing an external connection device in a portable terminal according to another exemplary embodiment of the present invention.

FIG. 5 is a flowchart showing a method of processing an external connection device in a portable terminal according to another exemplary embodiment of the present invention.

Referring to FIG. 5, when an external connection device is connected to the portable terminal 100 (Step 501), the USB interface control is started (Step 503). The USB standard defines the external connection device to have the pull-down resistor Rpd. Thus, when the portable terminal 100 is connected to the external connection device, a voltage is applied through the pull-up resistor Rpu in the portable terminal 100 to start the USB interface.

Next, when the USB interface is started, the portable terminal 100 detects the logic level from the USB interface (Step 505). The logic level includes a logic high signal and a logic low signal. In the present exemplary embodiment, when the logic high signal is detected, the portable terminal 100 recognizes that the external connection device is the TA 300 (Step 509). When the logic low signal is detected, the portable terminal 100 recognizes that the external connection device is the external device 200 (Step 515).

When the external connection device is the TA 300, since the first and second signal lines D+ and D− of the TA 300 are shorted to each other as described above, the logic high signal is applied to the portable terminal 100. In a case when the external connection device is the external device 200, the pull-down resistor Rpd defined in the USB standard is connected to the first and second signal lines D+ and D− of the external device 200 as described above and the portable terminal 100 may detect the logic low signal with the internal circuit of the detector 160.

Next, the portable terminal 100 determines whether the detected logic level is the logic high or the logic low (Step 507).

When the logic level is the logic high, the portable terminal 100 determines that the external connection device is the TA 300 (Step 509). Continuously, the portable terminal 100 activates the charging mode (Step 511) and charges the battery of the portable terminal 100 (Step 513).

When the logic level is the logic low, the portable terminal 100 recognizes that the external connection device is the external device 200 (Step 515). Continuously, the portable terminal 100 activates the communication mode (Step 517) and performs data communication with the external device 200 (Step 519).

Figure 6:
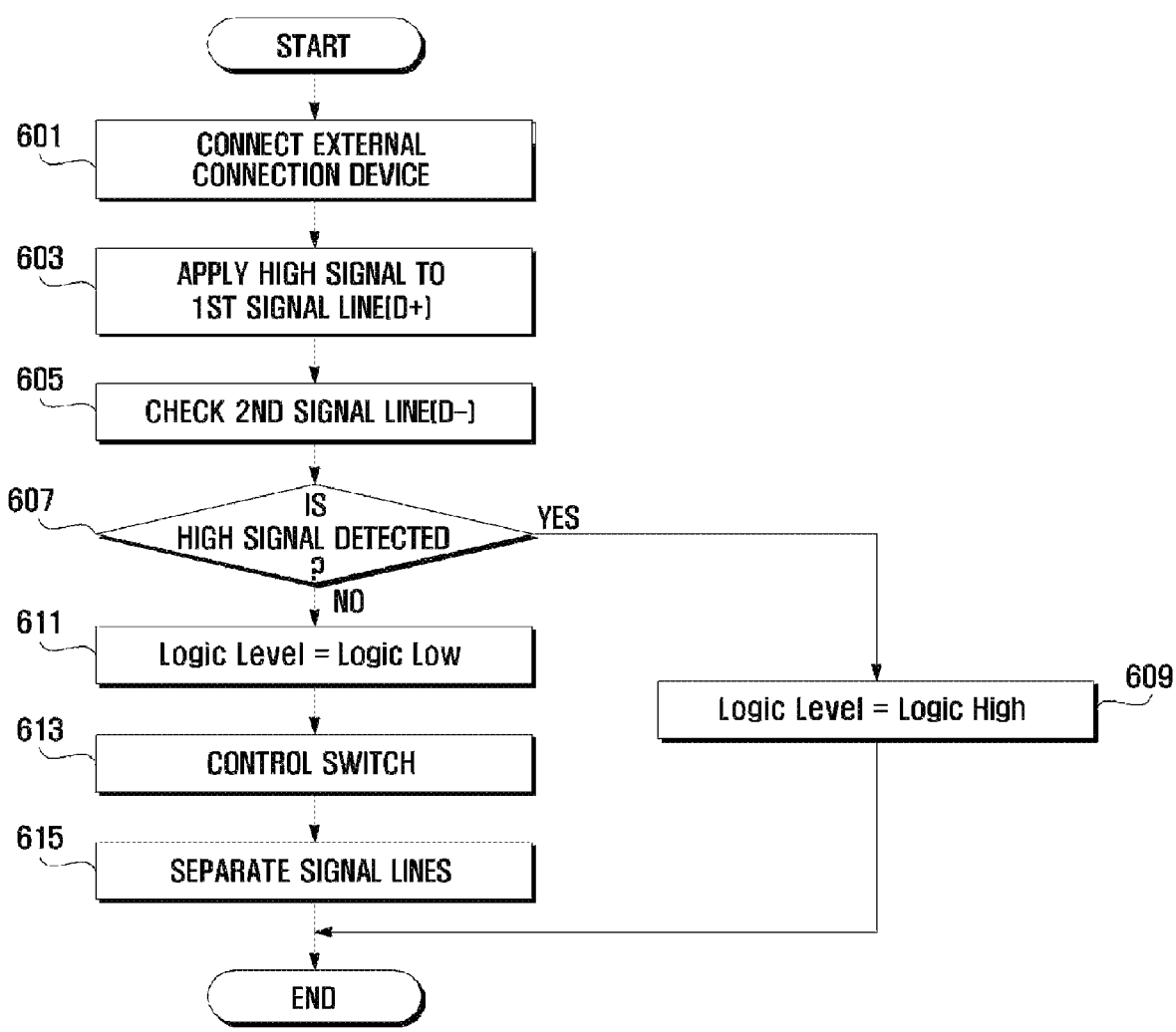
FIG. 6 is a flowchart showing a logic level detecting method of determining an external connection device according to an exemplary embodiment of the present invention.

FIG. 6 is a flowchart showing a logic level detecting method of determining an external connection device according to an exemplary embodiment of the present invention.

Referring to FIG. 6, when an external connection device is connected (Step 601), a high signal is applied to the first signal line D+ of the external connection interface 150 for detection of the logic level (Step 603) and a signal applied to the second signal line D− is checked (Steps 605 and 607).

By the checking of the second signal line D−, when the high signal is detected from the second signal line D+ (Step 607), the logic level is set to the logic high and is output (Step 609).

When the high signal is not detected from the second signal line (Step 607), the logic level is set to the logic low and is output (Step 611).

When the logic level is set to the logic low, the pull-up voltage is applied to control the switch (Step 613) such that the first and second signal lines D+ and D− are separated from the detector 160 (Step 615).

The exemplary embodiments of the present invention have been described to distinguish the terminal adaptor 300 from the external device 200. The external device 200 is a device to be connected to the portable terminal 100 of the present invention, and the present invention may be applied to distinguish a kind of the external device 200 connected to the portable terminal 100 using an input signal detection which is different in size and type.

As described above, according to the external device determining method and apparatus of a portable terminal of the present invention, a kind of the external connection device, such as a TA, and other external device, which is connected to the portable terminal through the data cable, is precisely determined, and normal transmission and reception of signals are performed according to the determination so that malfunction of the portable terminal can be prevented. Therefore, it is possible to protect the portable terminal and the external connection device and to perform services based on the normal operations of the portable terminal and the external connection device.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

What is claimed is:

1. A method of determining an external connection device in a portable terminal, comprising:
   determining a logic level of the external connection device when the external connection device is connected to the portable terminal;
   distinguishing the external connection device according to the logic level; and
   performing a control that corresponds to the external connection device, wherein determining the logic level comprises:
      applying a first type signal to the external connection device via a first signal line connected to the external connection device;
      detecting a signal from the external connection device via a second signal line connected to the external connection device, the signal from the external connection device being received in response to application of the first type signal;
      setting the logic level to a first logic level in response to the detected signal being the first type signal; and
      setting the logic level to a second logic level in response to the detected signal not being the first type signal.

2. The method of claim 1, further comprising:
   recognizing the external connection device as a terminal adaptor when the logic level is the first logic level; and
   recognizing the external connection device as an external device when the logic level is the second logic level.

3. The method of claim 2, further comprising breaking an input from the first signal line and the second signal line when the logic level is the second logic level.

4. A method of determining an external connection device in a portable terminal, comprising:
   detecting a logic level from a signal line of the external connection device when the external connection device is connected to the portable terminal, and outputting the detected logic level;
   determining the logic level;
   recognizing the external connection device as a terminal adaptor when the logic level has a first value;
   recognizing the external connection device as an external device when the logic level has a second value; and
   performing a control that corresponds to the external connection device,
   wherein detecting and determining the logic level comprises:
      applying a first type signal to the external connection device via a first signal line connected to the external connection device;
      detecting a signal from the external connection device via a second signal line connected to the external connection device, the signal from the external connection device being received in response to application of the first type signal;
      setting the logic level to the first value in response to the detected signal being the first type signal; and
      setting the logic level to the second value in response to the detected signal not being the first type signal.

5. The method of claim 4, further comprising cutting off a connection path to the first signal line and the second signal line when the logic level is the second value.

6. A portable terminal connectable to an external connection device, comprising:
   an external connection interface to which the external connection device connects;
   a detector to detect a signal from the external connection device via a second signal line connected to the external connection device, to set a logic level to a first value in response to the detected signal being a first type signal applied to the external connection device via a first signal line connected to the external connection device, to set the logic level to a second value in response to the detected signal not being the first type signal, and to output the logic level; and
   a control unit to control the external connection interface and the detector, to determine a kind of the external connection device from the logic level, and to control a signal processing with respect to the external connection device,
   wherein the signal from the external connection device is received in response to application of the first type signal.

7. The portable terminal of claim 6, wherein the external connection interface applies a pull-up voltage to at least one of the first signal line and the second signal line, the external connection interface being configured for signal transmission and reception with the external connection device.

8. The portable terminal of claim 7, wherein the detector acquires the logic level from the second signal line, the second signal line being different from the first signal line to which the pull-up voltage is applied.

9. The portable terminal of claim 8, wherein the detector outputs the logic level as the first value when it detects the pull-up voltage from the second signal line, and outputs the logic level as the second value when it fails to detect the pull-up voltage from the second signal line.

10. The portable terminal of claim 9, wherein the control unit recognizes the external connection device as a terminal adaptor when the first value is applied from the detector, and recognizes the external connection device as an external device when the second value is applied from the detector.

11. The portable terminal of claim 10, wherein the control unit comprises a determining unit to distinguish the external connection device according to the logic level.

12. The portable terminal of claim 11, wherein the determining unit comprises one of a General Purpose In/Out (GPIO) or a detection pin.

13. The portable terminal of claim 7, wherein the first signal line and the second signal line are shorted to each other when the external connection device is a terminal adaptor.

14. The portable terminal of claim 9, wherein the detector comprises:
  a switch to switch on and off paths to the first signal line and the second signal line of the external connection interface; and
  a resistor to apply a pull-up voltage for the control of the switching on and off the switch.

15. The portable terminal of claim 14, wherein the pull-up voltage has a value of low until a data communication with the external connection device is started, and the switch connects a path between the detector and the first signal line and the second signal line of the external connection interface when the pull-up voltage is low.

16. The portable terminal of claim 14, wherein the pull-up voltage has a value of high during a data communication with the external connection device, and the switch cuts off a path between the detector and the first line and the second line of the external connection interface when the pull-up voltage is high.

17. The portable terminal of claim 10, wherein the control unit determines a kind of the external device according to a change of a voltage applied to the first signal line and the second signal line.

18. The portable terminal of claim 17, wherein the control unit compares a preset reference data with the voltage change to determine a kind of the connected external device.

19. The portable terminal of claim 6, further comprising a memory storing an application for determining the external connection device, and reference data on the external connection device.

* * * * *